US012718534B2

(12) United States Patent
Tanaka et al.

(10) Patent No.: US 12,718,534 B2
(45) Date of Patent: Aug. 25, 2026

(54) APPARATUS, METHOD, RECORDING MEDIUM TO EXTRACT UNLABELED DATA FOR UPDATING A MODEL

(71) Applicant: NEC Corporation, Tokyo (JP)

(72) Inventors: Yuki Tanaka, Tokyo (JP); Makoto Terao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 272 days.

(21) Appl. No.: 18/390,101

(22) Filed: Dec. 20, 2023

(65) Prior Publication Data

US 2024/0221368 A1 Jul. 4, 2024

(30) Foreign Application Priority Data

Dec. 28, 2022 (JP) ................................ 2022-212499

(51) Int. Cl.
*G06V 10/774* (2022.01)
*G06V 10/74* (2022.01)
*G06V 10/77* (2022.01)

(52) U.S. Cl.
CPC ........ *G06V 10/7753* (2022.01); *G06V 10/761* (2022.01); *G06V 10/7715* (2022.01)

(58) Field of Classification Search
None
See application file for complete search history.

(56) References Cited

U.S. PATENT DOCUMENTS 8,650,138 B2 * 2/2014 Momma ................. G06F 16/90 706/12
11,205,103 B2 * 12/2021 Zhang ................... G06N 20/10
(Continued)

FOREIGN PATENT DOCUMENTS

JP 2017-167834 A 9/2017
JP WO2019/102962 A 11/2020
WO 2014/136316 A1 9/2014

OTHER PUBLICATIONS

Sohn, Kihyuk, et al. "Fixmatch: Simplifying semi-supervised learning with consistency and confidence." Advances in neural information processing systems 33 (2020): 596-608. (Year: 2020).*
(Continued)

*Primary Examiner* — Tahmina N Ansari
(74) *Attorney, Agent, or Firm* — Sughrue Mion, PLLC

(57) ABSTRACT

In order to provide a technique for generating a high-inference accuracy learning model in machine learning in which unlabeled data is used, an information processing apparatus includes: an acquiring section configured to acquire labeled data and unlabeled data, the labeled data being image data to which a ground-truth label and attribute information are attached, the unlabeled data being image data to which an attribute information is attached; an inter-attribute distance calculating section configured to calculate a distance between the labeled data and the unlabeled data, the distance being determined by the attribute information; an extracting section configured to extract, from multiple pieces of unlabeled data each being the unlabeled data, unlabeled data smaller in the distance from the labeled data than another unlabeled data; and an updating section configured to update a model parameter with use of the labeled data and the unlabeled data extracted by the extracting section.

9 Claims, 10 Drawing Sheets

(56) References Cited

U.S. PATENT DOCUMENTS

| | | | | |
|---|---|---|---|---|
| 11,631,208 | B1 * | 4/2023 | Khirman | G06N 3/088 382/100 |
| 11,897,471 | B2 * | 2/2024 | Sajjadi Mohammadabadi | G06V 20/588 |
| 12,387,271 | B2 * | 8/2025 | Nawab | G06Q 40/08 |
| 2011/0231350 | A1 * | 9/2011 | Momma | G06F 18/23 706/12 |
| 2020/0293796 | A1 * | 9/2020 | Sajjadi Mohammadabadi | B60W 30/095 |
| 2023/0260045 | A1 * | 8/2023 | Nawab | G06V 10/82 705/2 |
| 2023/0401829 | A1 * | 12/2023 | Liu | G06V 10/762 |
| 2024/0221368 | A1 * | 7/2024 | Tanaka | G06V 10/7715 |
| 2025/0182506 | A1 * | 6/2025 | Rognin | G06V 10/774 |

OTHER PUBLICATIONS

Kihyuk Sohn et al., “FixMatch: Simplifying Semi-Supervised Learning with Consistency and Confidence”, NeurIPS (2020), pp. 1-13.

* cited by examiner

FIG. 3
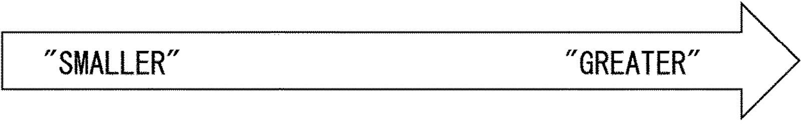
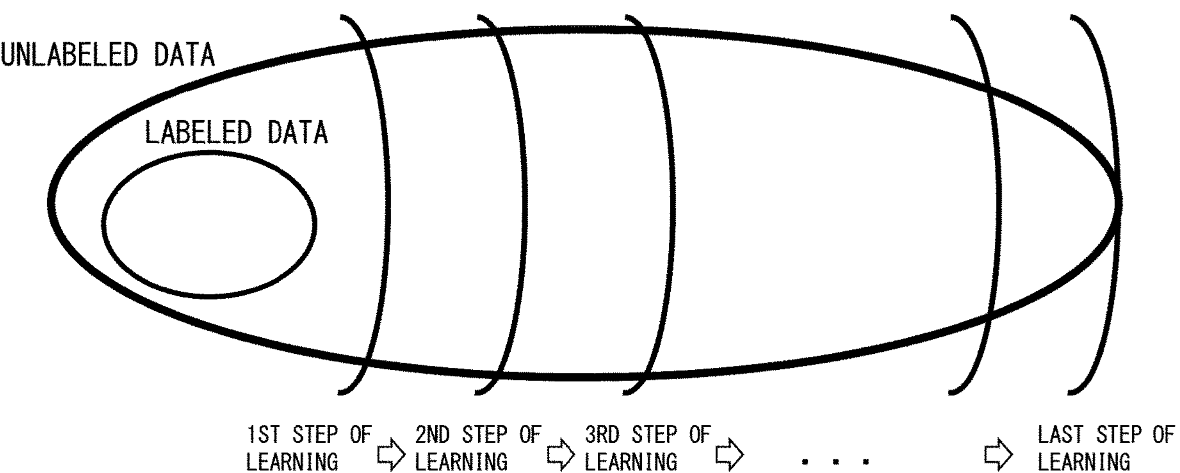

Figure 5:
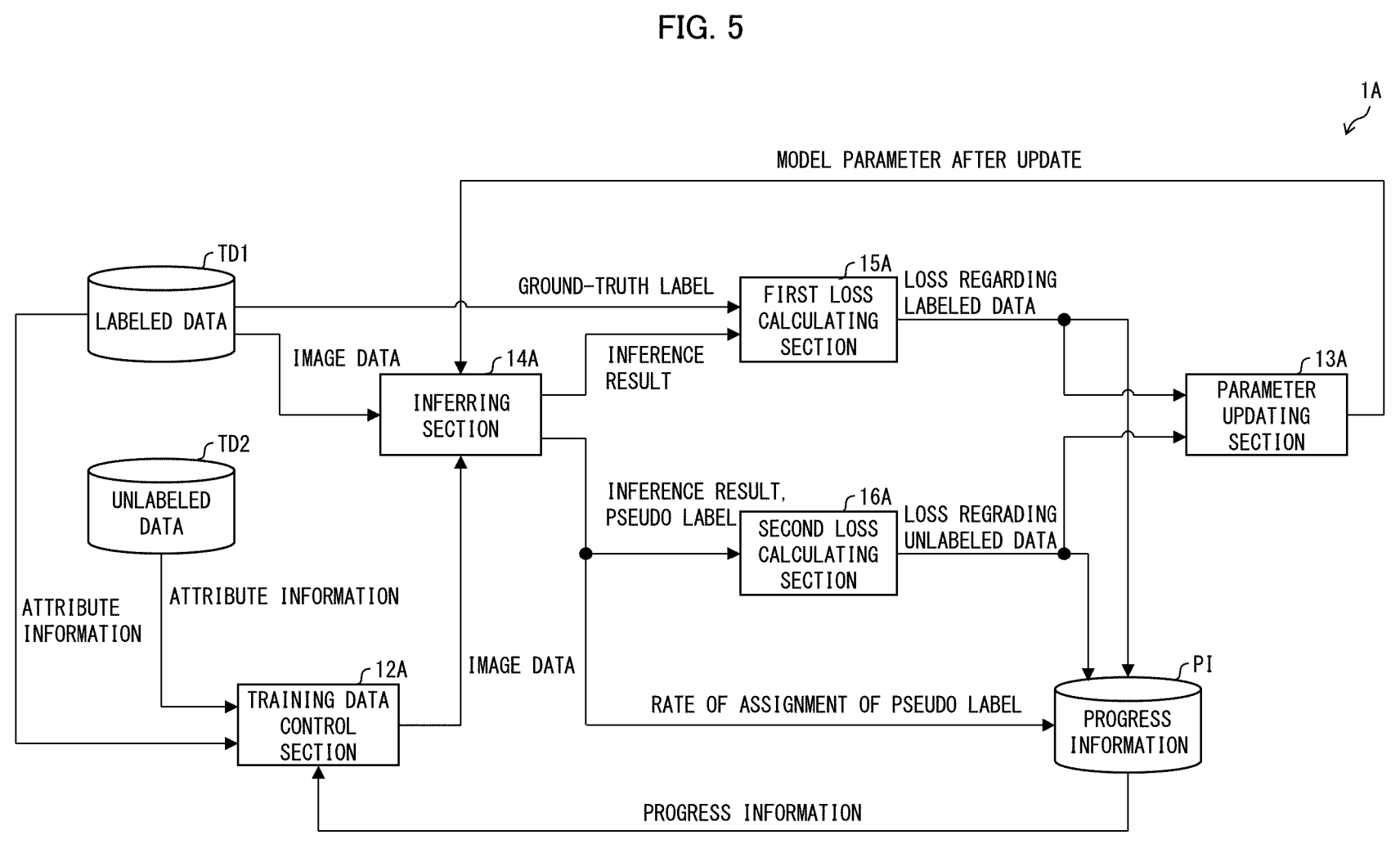

MODEL PARAMETER AFTER UPDATE

TD1
LABELED DATA

GROUND-TRUTH LABEL

15A
FIRST LOSS CALCULATING SECTION

LOSS REGARDING LABELED DATA

IMAGE DATA

14A
INFERRING SECTION

INFERENCE RESULT

13A
PARAMETER UPDATING SECTION

TD2
UNLABELED DATA

INFERENCE RESULT, PSEUDO LABEL

16A
SECOND LOSS CALCULATING SECTION

LOSS REGRADING UNLABELED DATA

ATTRIBUTE INFORMATION

ATTRIBUTE INFORMATION

12A
TRAINING DATA CONTROL SECTION

IMAGE DATA

RATE OF ASSIGNMENT OF PSEUDO LABEL

PI
PROGRESS INFORMATION

PROGRESS INFORMATION

FIG. 6

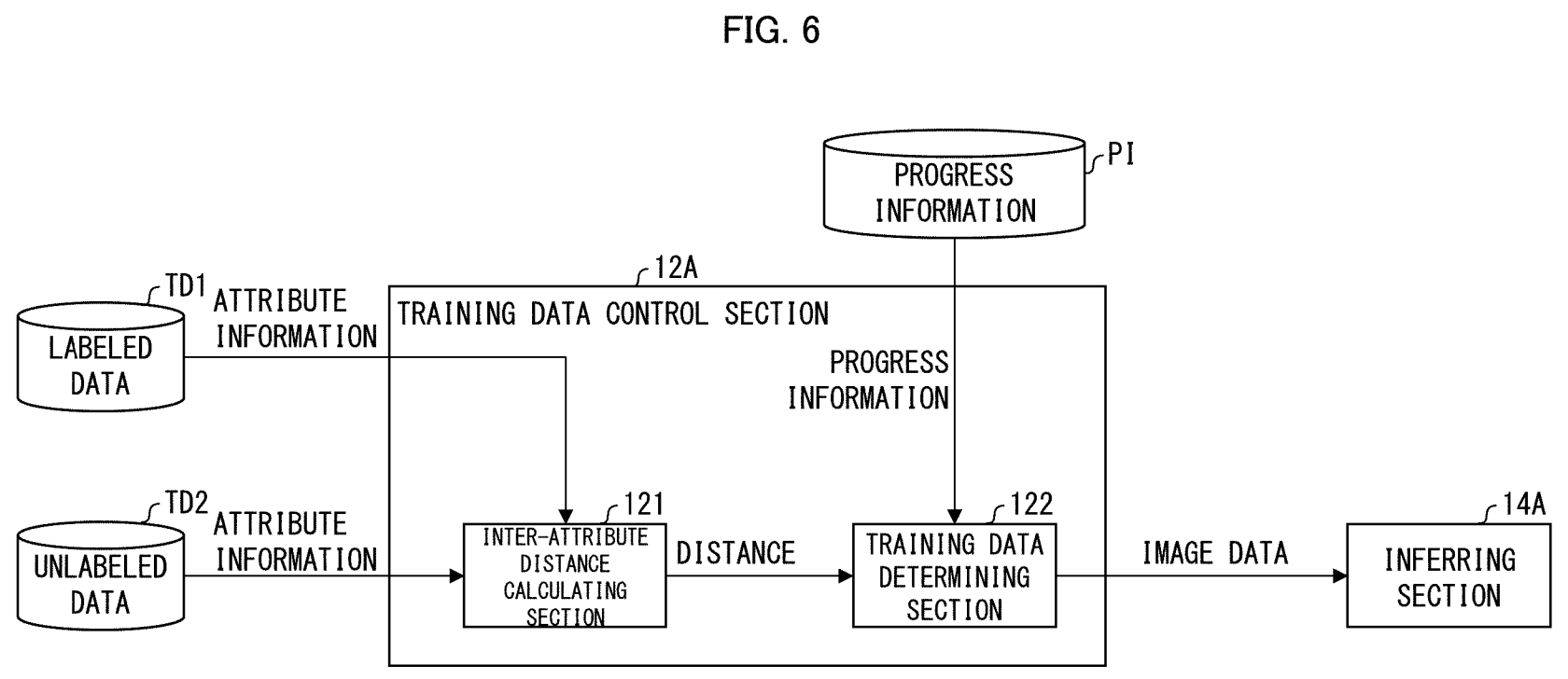

TD1 LABELED DATA
ATTRIBUTE INFORMATION
TD2 UNLABELED DATA
ATTRIBUTE INFORMATION
12A TRAINING DATA CONTROL SECTION
121 INTER-ATTRIBUTE DISTANCE CALCULATING SECTION
DISTANCE
PI PROGRESS INFORMATION
PROGRESS INFORMATION
122 TRAINING DATA DETERMINING SECTION
IMAGE DATA
14A INFERRING SECTION

FIG. 7

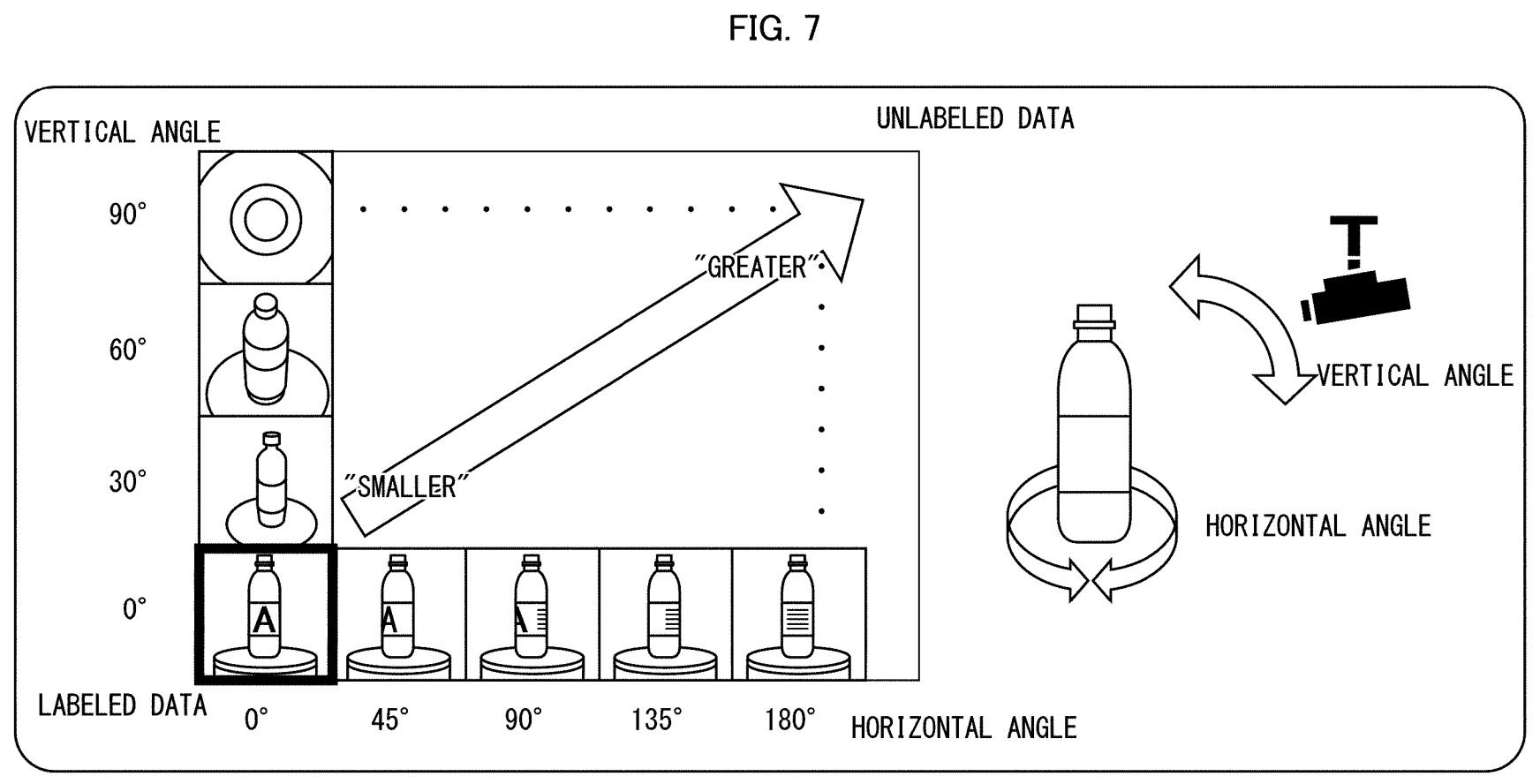

UNLABELED DATA
VERTICAL ANGLE
HORIZONTAL ANGLE
"GREATER"
"SMALLER"
VERTICAL ANGLE
90°
60°
30°
0°
LABELED DATA
0°
45°
90°
135°
180°
HORIZONTAL ANGLE

FIG. 10

APPARATUS, METHOD, RECORDING MEDIUM TO EXTRACT UNLABELED DATA FOR UPDATING A MODEL

CROSS REFERENCE TO RELATED APPLICATIONS

This application is based upon and claims the benefit of priority from Japanese Patent Application No. 2022-212499 filed on Dec. 28, 2022, the disclosure of which is incorporated herein in its entirety by reference.

TECHNICAL FIELD

The present invention relates to a technique for generating a learning model through machine learning.

BACKGROUND ART

With supervised learning, it is possible to construct a high-accuracy trained model through learning in which a large amount of labeled training data labeled with a ground-truth label is used. However, it is necessary to collect a large number of images, attach ground-truth labels, and do any other tasks in order to prepare a large amount of labeled training data. This entails a problem of high operating cost. To address this, an approach has been proposed which provides a trained model having high accuracy, with use of a small amount of labeled data and a large amount of unlabeled data (see, for example, Non-Patent Literature 1 and Patent Literature 1).

CITATION LIST

Patent Literature

[Patent Literature 1]
International Publication No. WO2014/136316

Non-Patent Literature

[Non-Patent Literature 1]
Kihyuk Sohn et al., FixMatch: Simplifying Semi-Supervised Learning with Consistency and Confidence, NeurIPS (2020)

SUMMARY OF INVENTION

Technical Problem

However, there is a problem of incorrect pseudo label generation regarding unlabeled data and failure in making a good progress in learning, with the techniques disclosed in Non-Patent Literature 1 and Patent Literature 1, which are thus susceptible of improvement from the perspective of increasing the inference accuracy of a learning model.

An example aspect of the present invention has been made in view of the above problem, and example object thereof is to provide a technique for generating a high-inference accuracy learning model in machine learning in which unlabeled data is used.

Solution to Problem

An information processing apparatus in accordance with an example aspect of the present invention includes at least one processor, and the at least one processor carries out: an acquiring process of acquiring labeled data and unlabeled data, the labeled data being image data to which a ground-truth label and attribute information indicating an attribute of an image are attached, the unlabeled data being image data to which an attribute information indicating an attribute of an image is attached; an inter-attribute distance calculating process of calculating a distance between the labeled data and the unlabeled data, the distance being determined by the attribute information of the labeled data and the attribute information of the unlabeled data; an extracting process of extracting, from multiple pieces of unlabeled data each being the unlabeled data, unlabeled data smaller in the distance from the labeled data than another unlabeled data; and an updating process of updating a model parameter of a learning model with use of the labeled data and the unlabeled data extracted in the extracting process.

An information processing method in accordance with an example aspect of the present invention includes: at least one processor acquiring labeled data and unlabeled data, the labeled data being image data to which a ground-truth label and attribute information indicating an attribute of an image are attached, the unlabeled data being image data to which an attribute information indicating an attribute of an image is attached; the at least one processor calculating a distance between the labeled data and the unlabeled data, the distance being determined by the attribute information of the labeled data and the attribute information of the unlabeled data; the at least one processor extracting, from multiple pieces of unlabeled data each being the unlabeled data, unlabeled data smaller in the distance from the labeled data than another unlabeled data; and the at least one processor updating a model parameter of a learning model with use of the labeled data and the unlabeled data extracted.

A computer-readable, non-transitory recording medium in accordance with an example aspect of the present invention has recorded thereon a program for causing a computer to carry out: a process of acquiring labeled data and unlabeled data, the labeled data being image data to which a ground-truth label and attribute information indicating an attribute of an image are attached, the unlabeled data being image data to which an attribute information indicating an attribute of an image is attached; a process of calculating a distance between the labeled data and the unlabeled data, the distance being determined by the attribute information of the labeled data and the attribute information of the unlabeled data; a process of extracting, from multiple pieces of unlabeled data each being the unlabeled data, unlabeled data smaller in the distance from the labeled data than another unlabeled data; and a process of updating a model parameter of a learning model with use of the labeled data and the unlabeled data extracted.

Advantageous Effects of Invention

According to an example aspect of the present invention, it is possible to generate a high-inference accuracy learning model in machine learning in which unlabeled data is used.

BRIEF DESCRIPTION OF DRAWINGS

FIG. 3 is a diagram illustrating an outline of machine learning conducted by information processing apparatus in accordance with a second example embodiment.

FIG. 5 is a block diagram illustrating an example of a functional configuration and a process flow of the information processing apparatus, in accordance with the second example embodiment.

FIG. 6 is a diagram illustrating an example configuration of a training data control section in accordance with the second example embodiment.

FIG. 7 is a diagram illustrating a specific example of an inter-attribute distance in accordance with the second example embodiment.

FIG. 10 is a block diagram illustrating a configuration of a computer which functions as the information processing apparatuses in accordance with the example embodiments.

EXAMPLE EMBODIMENTS

First Example Embodiment

The following description will discuss a first example embodiment of the present invention in detail, with reference to the drawings. The present example embodiment is basic to an example embodiment which will be described later.

(Configuration of Information Processing Apparatus)

Figure 1:
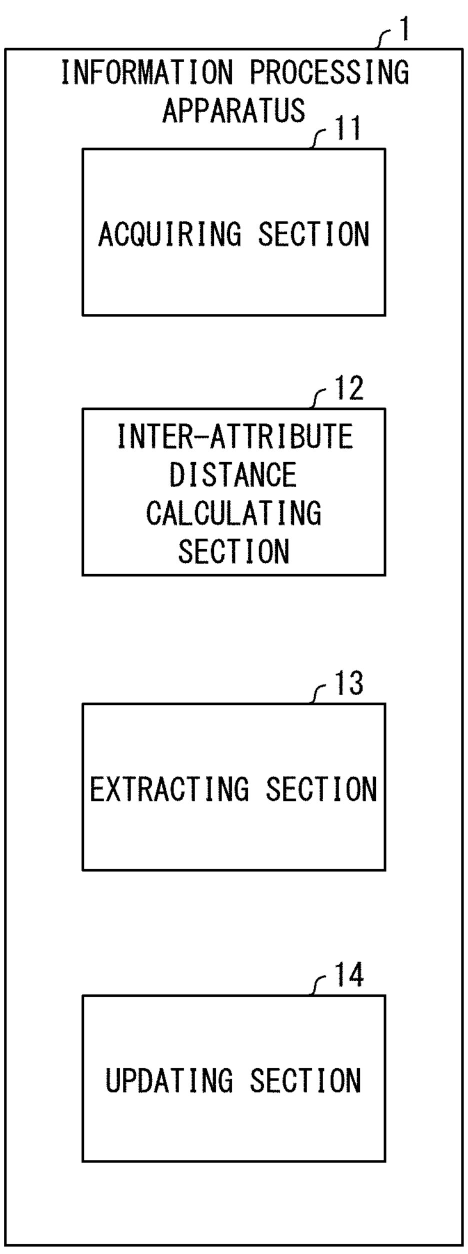
FIG. 1 is a block diagram illustrating a configuration of an information processing apparatus in accordance with a first example embodiment.

A configuration of an information processing apparatus 1 in accordance with the present example embodiment will be described below with reference to FIG. 1. FIG. 1 is a block diagram illustrating a configuration of the information processing apparatus 1. The information processing apparatus 1 includes an acquiring section 11 (acquiring means), an inter-attribute distance calculating section 12 (inter-attribute distance calculating means), an extracting section 13 (extracting means), and an updating section 14 (updating means).

The acquiring section 11 acquires labeled data and unlabeled data, the labeled data being image data to which a ground-truth label and attribute information indicating an attribute of an image are attached, the unlabeled data being image data to which an attribute information indicating an attribute of an image is attached. The inter-attribute distance calculating section 12 calculates a distance between the labeled data and the unlabeled data, the distance being determined by the attribute information of the labeled data and the attribute information of the unlabeled data. The extracting section 13 extracts, from multiple pieces of unlabeled data each being the unlabeled data, unlabeled data smaller in the distance from the labeled data than another unlabeled data. The updating section 14 updates a model parameter of a learning model with use of the labeled data and the unlabeled data extracted by the extracting section 13.

As above, a configuration employed in the information processing apparatus 1 in accordance with the present example embodiment is such that an acquiring section 11, an inter-attribute distance calculating section 12, an extracting section 13, and an updating section 14 are included, the acquiring section 11 acquiring labeled data and unlabeled data, the labeled data being image data to which a ground-truth label and attribute information indicating an attribute of an image are attached, the unlabeled data being image data to which an attribute information indicating an attribute of an image is attached, the inter-attribute distance calculating section 12 calculating a distance between the labeled data and the unlabeled data, the distance being determined by the attribute information of the labeled data and the attribute information of the unlabeled data, the extracting section 13 extracting, from multiple pieces of unlabeled data each being the unlabeled data, unlabeled data smaller in the distance from the labeled data than another unlabeled data, the updating section 14 updating a model parameter of a learning model with use of the labeled data and the unlabeled data extracted by the extracting section 13. Therefore, the information processing apparatus 1 in accordance with the present example embodiment provides an example advantage of being capable of generating a high-inference accuracy learning model in machine learning in which unlabeled data is used.

(Program)

The functions of the above information processing apparatus 1 can be implemented via a program. A program in accordance with the present example embodiment is a program for causing a computer to carry out: a process of acquiring labeled data and unlabeled data, the labeled data being image data to which a ground-truth label and attribute information indicating an attribute of an image are attached, the unlabeled data being image data to which an attribute information indicating an attribute of an image is attached; a process of calculating a distance between the labeled data and the unlabeled data, the distance being determined by the attribute information of the labeled data and the attribute information of the unlabeled data; a process of extracting, from multiple pieces of unlabeled data each being the unlabeled data, unlabeled data smaller in the distance from the labeled data than another unlabeled data; and a process of updating a model parameter of a learning model with use of the labeled data and the unlabeled data extracted.

(Flow of Information Processing Method)

Figure 2:
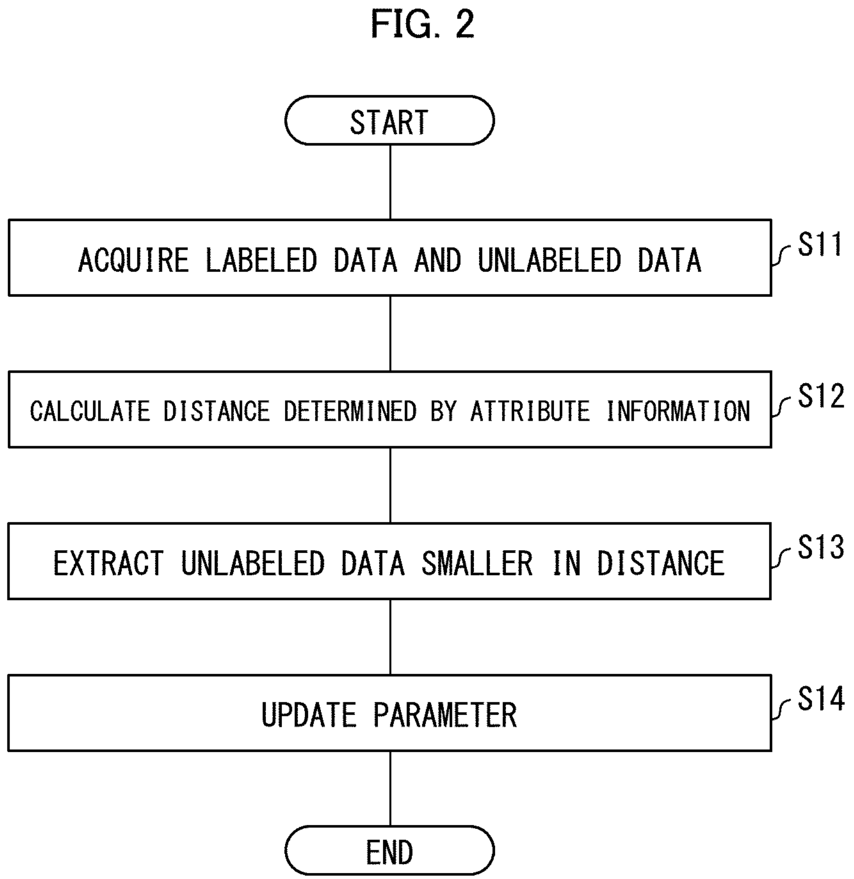
FIG. 2 is a flowchart illustrating a flow of the information processing method in accordance with the first example embodiment.

A flow of an information processing method S1 in accordance with the present example embodiment will be described below with reference to FIG. 2. FIG. 2 is a flowchart illustrating a flow of the information processing method S1. It should be noted that a processor included in the information processing apparatus 1 may carry out the steps of the information processing method S1, or a processor included in another apparatus may carry out the steps of the information processing method S1.

In S11, at least one processor acquires labeled data and unlabeled data, the labeled data being image data to which a ground-truth label and attribute information indicating an attribute of an image are attached, the unlabeled data being image data to which an attribute information indicating an attribute of an image is attached. In S12, the at least one processor calculates a distance between the labeled data and the unlabeled data, the distance being determined by the attribute information of the labeled data and the attribute information of the unlabeled data. In S13, the at least one processor extracts, from multiple pieces of unlabeled data each being the unlabeled data, unlabeled data smaller in the distance from the labeled data than another unlabeled data. In S14, the at least one processor updates a model parameter of a learning model with use of the labeled data and the unlabeled data extracted.

As above, the information processing method S1 in accordance with the present example embodiment includes: at least one processor acquiring labeled data and unlabeled data, the labeled data being image data to which a ground-truth label and attribute information indicating an attribute of an image are attached, the unlabeled data being image data to which an attribute information indicating an attribute of an image is attached; the at least one processor calculating a distance between the labeled data and the unlabeled data, the distance being determined by the attribute information of the labeled data and the attribute information of the unlabeled data; the at least one processor extracting, from multiple pieces of unlabeled data each being the unlabeled data, unlabeled data smaller in the distance from the labeled data than another unlabeled data; and the at least one processor updating a model parameter of a learning model with use of the labeled data and the unlabeled data extracted. Therefore, the information processing method S1 in accordance with the present example embodiment provides an example advantage of being capable of generating a high-inference accuracy learning model in machine learning in which unlabeled data is used.

Second Example Embodiment (Outline of Information Processing Apparatus)

The following description will discuss a second example embodiment of the present invention with reference to the drawings. An information processing apparatus 1A in accordance with the present example embodiment generates a learning model through machine learning. Examples of the learning model include a model for identifying an object (such as a commercial product) contained in an image, a model for recognizing an action of a person contained in an image, and a model for classifying an image. The learning model in accordance with the present example embodiment can be used not only for image classification but also for image recognition tasks in general, which includes object detection and segmentation. However, the learning model is not limited to the above examples. Examples of a method for training the learning model include a neural network and a support vector machine (SVM). However, the method for training the learning model is not limited to the above examples. As an example, the input to the learning model in an inference phase includes image data. As an example, the output from the learning model includes information indicating the result of identifying an object (such as a commercial product), the result of recognizing an action of a person, the result of classifying an image, etc.

The information processing apparatus 1A generates a learning model with use of labeled data and unlabeled data. The labeled data is data which is image data to which attribute information and a ground-truth label are attached. As an example, the labeled data is data that is image data which represents a captured image of a commercial product and to which attribute information indicating the posture of the commercial product and a label indicating the type of the commercial product are attached. The unlabeled data is data that is image data to which attribute information is attached, but a ground-truth label is not attached to the unlabeled data. As an example, the unlabeled data is data that is image data which represents a captured image of a commercial product and to which attribute information indicating the posture of the commercial product is attached.

The attribute information indicates the attribute of an image. As an example, the attribute information includes information indicating at least one selected from the group consisting of the posture and the position of an object contained in the image, the time of image capture, an image capture time period (morning, noon, evening, night, or the like), the type and the position of an image capturing apparatus, and an image quality. As an example, the information indicating the position of an object includes information indicating the coordinates of the object, information for identifying a shelf on which the object is placed, and the like. As an example, the information indicating an image capture time period includes information indicating which time period the time of image capture of the object belongs to, morning, noon, evening, night, or any other time period. However, the attribute information is not limited to these kinds of information. Further, examples of the image data include data representing a captured image of a commercial product. However, the image data is not limited to this, but may be any other data.

The information processing apparatus 1A in accordance with the present example embodiment conducts training in such a manner that pseudo labels are assigned to some pieces of unlabeled data extracted from unlabeled data, and such pieces of unlabeled data to which the pseudo labels have been assigned and labeled data are used for the training, not in such a manner that all the pieces of unlabeled data are treated the same and are collectively used for the training. In such extraction, the information processing apparatus 1A extracts the unlabeled data to be used for training a learning model, in accordance with a distance between the labeled data and the unlabeled data, the distance being determined by attribute information.

According to the present example embodiment, the distance between the labeled data and the unlabeled data is a value determined by the attribute information of the labeled data and the attribute information of the unlabeled data. In the following description, the above distance determined by the attribute information of the labeled data and the attribute information of the unlabeled data is also referred to as an "inter-attribute distance". As an example, the inter-attribute distance is a value calculated in accordance with at least one selected from the group consisting of a difference in the posture and the position of the object contained in the image, a difference in the time of image capture, the degree of nearness in the image capture time period, the degree of similarity in the type of the image capturing apparatus, a difference in the position of the image capturing apparatus, and a difference in the image quality. As an example, the difference in the posture of the object is the difference in an angle (the difference in the vertical angle and/or the difference in the horizontal angle) of the object. As an example, the difference in the position of the object is the difference in the coordinates of the object. As an example, the difference in the position of the image capturing apparatus includes the difference in the coordinates of the image capturing apparatus and/or the difference in the angle of an image capture direction of the image capturing apparatus.

Furthermore, the inter-attribute distance may be a value calculated by a combination of a plurality of elements which indicate the attributes of an image. For example, the inter-attribute distance may be a value calculated with use of a difference in the angle of an object contained in an image and a difference in the time of image capture. However, the inter-attribute distance is not limited to the above example. For example, the inter-attribute distance may be information indicating the degree of similarity in the type of an image capturing apparatus.

FIG. 3 is a diagram illustrating an outline of machine learning conducted by the information processing apparatus 1A. In the example illustrated in FIG. 3, the information processing apparatus 1A trains a learning model in n separate steps which are the first to n-th steps. In the first step, the information processing apparatus 1A uses labeled data and some pieces of data of unlabeled data, to conduct training. In this respect, the unlabeled data used by the information processing apparatus 1A in the first step are some pieces of unlabeled data selected in ascending order of the inter-attribute distance from the labeled data. Further, in the second step, the information processing apparatus 1A uses unlabeled data that includes data the inter-attribute distance of which from the labeled data is greater than those of the pieces of unlabeled data used in the first step, to conduct training. Furthermore, in the third step, the information processing apparatus 1A uses unlabeled data the inter-attribute distance of which from labeled data is even greater, to conduct training. In this manner, the information processing apparatus 1A gradually increases the number of the pieces of unlabeled data to be used, as the training step progresses. In the n-th step, which is the last step, the information processing apparatus 1A uses the labeled data and all the pieces of unlabeled data, to conduct training. However, all the pieces of unlabeled data are not necessarily used in the last step, and there may be data which is not used for the training in the last step.

As above, according to the present example embodiment, the information processing apparatus 1A makes preferential use of unlabeled data the inter-attribute distance of which from the labeled data is smaller, to conduct training. In other words, the information processing apparatus 1A control the order in which pieces of unlabeled data is inputted for the training, in accordance with the inter-attribute distances. According to the present example embodiment, by making preferential use of unlabeled data the inter-attribute distance of which from the labeled data is smaller, to conduct training, and increasing the number of pieces of unlabeled data to be used for the training as the training progresses, it is possible to accurately generate a pseudo label and thus generate a high-inference accuracy learning model.

(Configuration of Information Processing Apparatus)

Figure 4:
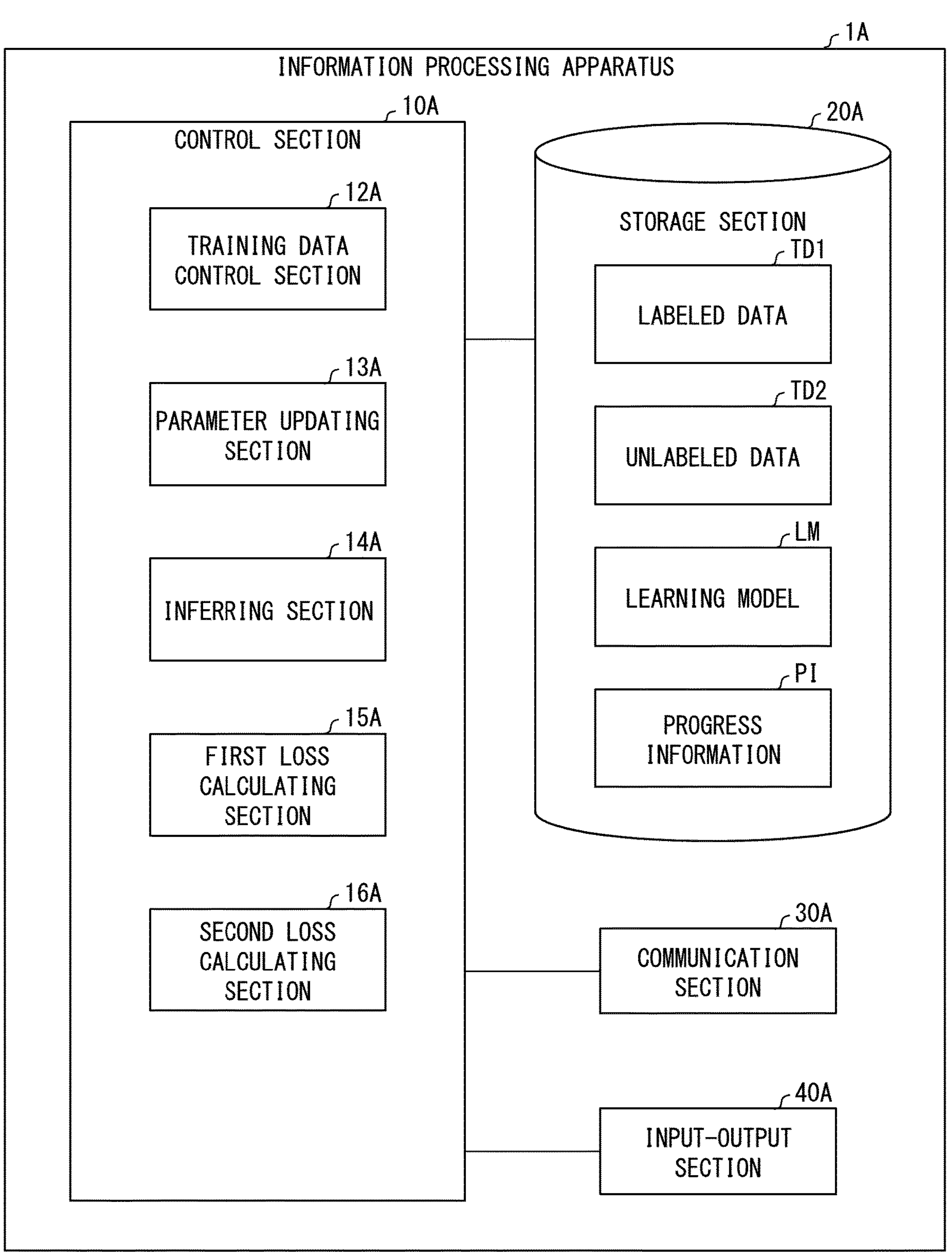
FIG. 4 is a block diagram illustrating a configuration of the information processing apparatus in accordance with the second example embodiment.

FIG. 4 is a block diagram illustrating a configuration of the information processing apparatus 1A in accordance with the present example embodiment. The information processing apparatus 1A includes a control section 10A, a storage section 20A, a communication section 30A, and an input-output section 40A. The control section 10A includes a training data control section 12A, a parameter updating section 13A, an inferring section 14A, a first loss calculating section 15A, and a second loss calculating section 16A. The training data control section 12A is an example of the acquiring means, the inter-attribute distance calculating means, and the extracting means in accordance with the present specification. The parameter updating section 13A is an example of the updating means in accordance with the present specification. The inferring section 14A is an example of the pseudo label assigning means in accordance with the present specification. The first loss calculating section 15A is an example of the loss calculating means and the first loss calculating means in accordance with the present specification. In addition, the second loss calculating section 16A is an example of the loss calculating means and the second loss calculating means in accordance with the present specification.

The training data control section 12A acquires labeled data and unlabeled data. For example, the training data control section 12A may acquire labeled data and unlabeled data via the input-output section 40A of the information processing apparatus 1A, or may receive labeled data and unlabeled data via the communication section 30A. Alternatively, the training data control section 12A may acquire labeled data and unlabeled data by retrieving labeled data and unlabeled data from internal storage of the information processing apparatus 1A or external storage.

The training data control section 12A calculates an inter-attribute distance between the labeled data and the unlabeled data, and extracts, from the acquired unlabeled data, unlabeled data to be used for training a learning model LM, according to the calculated inter-attribute distance and the status of progress of the training of the learning model LM. A process of calculating the inter-attribute distance and a process of extracting the unlabeled data which are carried out by the training data control section 12A will be described later.

The inferring section 14A makes an inference by inputting image data to the learning model LM. Further, the inferring section 14A assigns a pseudo label to unlabeled data extracted by the training data control section 12A, in accordance with an inference result obtained by inputting the unlabeled data to the learning model LM. The parameter updating section 13A uses the unlabeled data to which the pseudo label has been assigned and labeled data, to update a model parameter of the learning model LM. An update method carried out by the parameter updating section 13A will be described later.

The first loss calculating section 15A uses (i) an inference result obtained with use of labeled data and the learning model LM and (ii) a ground-truth label of the labeled data, to calculate a loss. The second loss calculating section 16A uses (i) an inference result obtained with use of unlabeled data and the learning model LM and (ii) a pseudo label of the unlabeled data, to calculate a loss.

The communication section 30A communicates with an apparatus external to the information processing apparatus 1A over a communication line. A specific configuration of the communication line does not limit the present example embodiment, but may be, for example, a wireless local area network (LAN), a wired LAN, a wide area network (WAN), a public network, a mobile data communication network, or a combination thereof. The communication section 30A transmits, to another apparatus, data supplied from the control section 10A, and supplies the control section 10A with data received from another apparatus.

To the input-output section 40A, input-output equipment such as a keyboard, a mouse, a display, a printer, or a touch panel is connected. The input-output section 40A accepts, from the input equipment connected thereto, input of various kinds of information to the information processing apparatus 1A. In addition, the input-output section 40A outputs various kinds of information to the output equipment connected thereto, under the control of the control section 10A. Examples of the input-output section 40A include an interface such as a universal serial bus (USB).

In the storage section 20A, labeled data TD1 and unlabeled data TD2 which are acquired by the training data control section 12A are stored. The learning model LM is also stored in the storage section 20A. In this respect, the learning model LM being stored in the storage section 20A means that model parameters which defines the learning model LM are stored in the storage section 20A.

Progress information PI is also stored in the storage section 20A. The progress information PI indicates the status of progress of machine learning of the learning model LM. As an example, the progress information PI includes information indicating at least one selected from the group consisting of the number of learning steps (learning time period), the rate of assignment of a pseudo label to unlabeled data, a loss calculated with use of labeled data, and a loss calculated with use of unlabeled data. However, the progress information PI is not limited to the above examples, but may be another information indicating the status of progress of learning.

FIG. 5 is a block diagram illustrating an example of a functional configuration and a process flow of the information processing apparatus 1A. It should be noted that a unidirectional arrow in FIG. 5 plainly represents the direction of the flow of a certain signal (data), and does not exclude bidirectionality. Specific examples of processes carried out by the training data control section 12A, the parameter updating section 13A, the inferring section 14A, the first loss calculating section 15A, and the second loss calculating section 16A illustrated in FIG. 5 will be described below with reference to the drawings.

(Training Data Control Section)

FIG. 6 is a diagram illustrating an examples of a configuration of the training data control section 12A. It should be noted that a unidirectional arrow in FIG. 6 plainly represents the direction of the flow of a certain signal (data), and does not exclude bidirectionality. In the example of FIG. 6, the training data control section 12A includes an inter-attribute distance calculating section 121 and a training data determining section 122. The inter-attribute distance calculating section 121 uses the attribute information of the labeled data and the attribute information of the unlabeled data to calculate an inter-attribute distance. The inter-attribute distance calculated by the inter-attribute distance calculating section 121 will be described later.

The training data determining section 122 extracts, from the unlabeled data TD2, unlabeled data to be used for training, in accordance with the inter-attribute distance calculated by the inter-attribute distance calculating section 121 and the progress information PI. In this respect, the unlabeled data extracted by the training data determining section 122 is smaller in the inter-attribute distance from the labeled data than another unlabeled data (unlabeled data which has not extracted). In a case where there are multiple pieces of labeled data, as an example, the inter-attribute distance calculating section 121 calculates, for each unlabeled data, respective inter-attribute distances from the multiple pieces of labeled data, and the training data determining section 122 uses the smallest one of the inter-attribute distances calculated for one piece of unlabeled data, to carry out the above extracting process.

Further, the training data determining section 122 extracts unlabeled data such that a maximum value of the distance of the unlabeled data increases as the machine learning of the learning model LM progresses. In the following description, data (the labeled data and the unlabeled data extracted by the training data determining section 122) to be used for training the learning model LM is also referred to as "training data".

(Inferring Section)

The description of FIG. 5 will be discussed below again. In FIG. 5, the inferring section 14A supplies the first loss calculating section 15A with an inference result obtained by inputting, to the learning model LM, image data included in the labeled data. As an example, the inference result includes an inference score which indicates the degree of accuracy of each label.

Further, the inferring section 14A assigns a pseudo label to unlabeled data extracted by the training data control section 12A, in accordance with the inference result obtained by inputting, to the learning model LM, image data included in the unlabeled data, and supplies the second loss calculating section 16A with the inference result and the pseudo label. In the attaching, the inferring section 14A does not assign pseudo labels to all the pieces of unlabeled data, but assigns a pseudo label to unlabeled data which has been extracted by the training data control section 12A and which provides, when inputted to the learning model LM, an inference result that satisfies a predetermined condition. More specifically, as an example, the inferring section 14A assigns a pseudo label to the unlabeled data that provides an inference score which is greater than a predetermined threshold. Furthermore, the inferring section 14A stores, in the storage section 20A, information indicating the rate of assignment of a pseudo label to the unlabeled data extracted by the training data control section 12A, the information being the progress information PI.

(First Loss Calculating Section)

The first loss calculating section 15A uses the inference result of labeled data supplied by the inferring section 14A and the ground-truth label of the labeled data, to calculate a loss. The first loss calculating section 15A supplies the parameter updating section 13A with the calculated loss, and stores, in the storage section 20A, the calculated loss, which is the progress information PI.

(Second Loss Calculating Section)

The second loss calculating section 16A uses the inference result, supplied by the inferring section 14A, of unlabeled data to which a pseudo label has been assigned and the pseudo label attached to the unlabeled data, to calculate a loss. The second loss calculating section 16A supplies the parameter updating section 13A with the calculated loss, and stores, in the storage section 20A, the calculated loss, which is the progress information PI.

(Parameter Updating Section)

The parameter updating section 13A uses the loss calculated by the first loss calculating section 15A and the loss calculated by the second loss calculating section 16A, to update the model parameters, which define the learning model LM. As an example, the parameter updating section 13A updates the model parameters such that the loss calculated by the first loss calculating section 15A and the loss calculated by the second loss calculating section 16A decrease. The processes from the inferring process carried out by the inferring section 14A to the model parameter updating process carried out by the parameter updating section 13A are repeatedly carried out, so that the learning of the learning model LM progresses.

(Specific Examples 1 to 3 of Inter-Attribute Distance)

Figure 8:
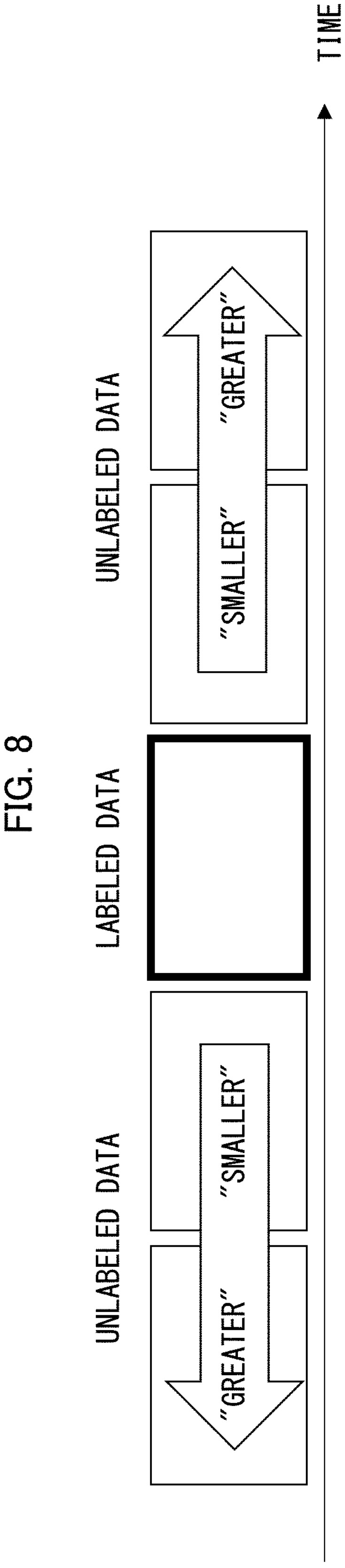
FIG. 8 is a diagram illustrating a specific example of the inter-attribute distance in accordance with the second example embodiment.
Figure 9:
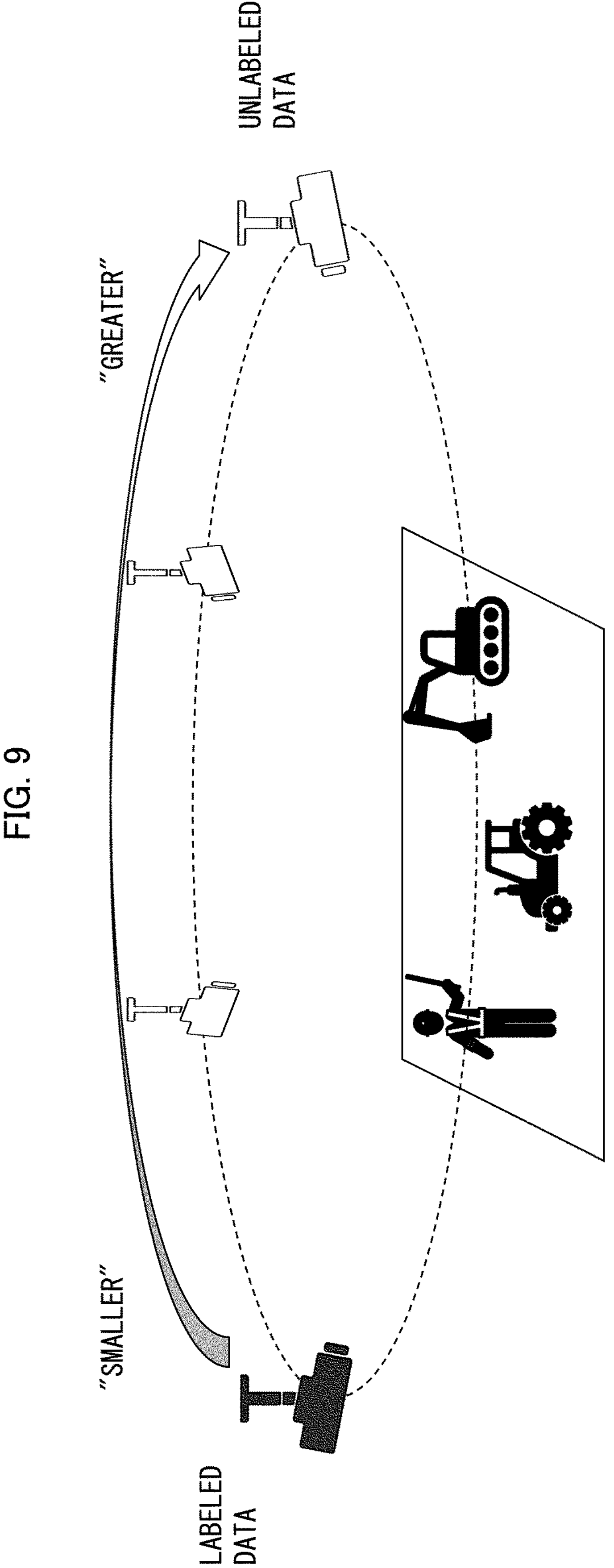
FIG. 9 is a diagram illustrating a specific example of the inter-attribute distance in accordance with the second example embodiment.

Specific examples 1 to 3 of the inter-attribute distance calculated by the inter-attribute distance calculating section 121 will be described below with reference to the drawings. FIGS. 7 to 9 are diagrams illustrating the specific examples 1 to 3 of the inter-attribute distance calculated by the inter-attribute distance calculating section 121. In the examples of FIGS. 7 to 9, the image data included in labeled data and the unlabeled data represents captured images of a commercial product.

(Specific Example 1 of Inter-Attribute Distance)

In the example of FIG. 7, the attribute information indicates the posture (angle) of the commercial product contained in the captured image, and the inter-attribute distance is a value determined in accordance with the difference in the posture (angle) of the commercial product contained in the image data. In this example, the inter-attribute distance is greater when the difference in the posture is greater.

In the example of FIG. 7, as an example, the image data included in labeled data represents an image of the commercial product obtained by capturing the image from the front. As an example, the front of the commercial product faces in a direction which makes it the easiest to visually identify a label or the like that reads the name of the commercial product. However, the image data included in the labeled data is not limited to the data representing the image obtained by capturing the commercial product from the front, but may be data representing an image obtained by capturing the commercial product from another direction.

The attribute information included in the labeled data indicates that the vertical angle and the horizontal angle of the commercial product contained in the captured image are 0° and 0°, respectively. In this respect, the vertical angle is the angle of a commercial product in the vertical direction, and the horizontal angle is the angle of a commercial product in the direction perpendicular to the vertical direction. Therefore, the front direction in the example of FIG. 7 is a direction in which the vertical angle is 0° and the horizontal angle is 0°. Further, image data included in the unlabeled data represents each of the images obtained by capturing the commercial product from different directions, and the attribute information included in the unlabeled data indicates the vertical angle and the horizontal angle of the commercial product contained in each of the captured images.

Given that the vertical angle and the horizontal angle of the labeled data are $\alpha_0$ and $\beta_0$, respectively, and the vertical angle and the horizontal angle of the unlabeled data are $\alpha_i$ and $\beta_i$, respectively, the inter-attribute distance calculating section 121 uses at least one of the differences which are the difference in the vertical angle $|\alpha_i-\alpha_0|$ and the difference in the horizontal angle $|\beta_i-\beta_0|$, to calculate the inter-attribute distance. As an example, the inter-attribute distance calculating section 121 may calculate the sum of squares of the difference in the vertical angle $|\alpha_i-\alpha_0|$ and the difference in the horizontal angle $|\beta_i-\beta_0|$ or may calculate the weighted sum of squares of the vertical angle $|\alpha_i-\alpha_0|$ and the difference in the horizontal angle $|\beta_i-\beta_0|$. The sum or the weighted sum is the inter-attribute distance.

The inter-attribute distance calculating section 121 may use the difference in the vertical angle alone, without use of the difference in the horizontal angle, to calculate the inter-attribute distance. In this case, the distances from the labeled data in which the vertical angle is 0° increase in the order of, for example, an image in which the vertical angle is 0° (the horizontal angle is any angle), an image in which the vertical angle is 30° (the horizontal angle is any angle), an image in which the vertical angle is 60° (the horizontal angle is any angle), . . . . In this case, the same difference in the vertical angle results in the same distance.

The inter-attribute distance calculating section 121 may use the difference in the vertical angle to calculate the inter-attribute distance, and for images having the same difference in the vertical angle, calculate the inter-attribute distance such that the distance is smaller when the difference in the horizontal angle is smaller. In this case, the distances from the labeled data in which the vertical angle is 0° and the horizontal angle is 0° increase in the order of, for example, an image in which the vertical angle is 0°, an image in which the vertical angle is 30°, an image in which the vertical angle is 60° . . . , and for images having the same difference in the vertical angle, the distance from the labeled data is greater when the difference in the horizontal angle is greater. However, the scheme to calculate the inter-attribute distance is not limited to the above example, but the inter-attribute distance calculating section 121 may calculate the inter-attribute distance by another scheme.

(Specific Example 2 of Inter-Attribute Distance)

In the example of FIG. 8, the attribute information indicates a time of image capture, and the inter-attribute distance is a value determined in accordance with the difference in the time of image capture. In this example, the inter-attribute distance is greater when the difference in the time is greater. In this case, the image data included in labeled data represents an image captured at a certain time. The image data included in unlabeled data represents each of images captured at different times.

(Specific Example 3 of Inter-Attribute Distance)

In the example of FIG. 9, the attribute information indicates the position (coordinates) and the angle of an image capturing apparatus, and the inter-attribute distance is a value determined in accordance with the difference(s) in the coordinates of the position and/or the angle of the image capturing apparatus. In this example, the inter-attribute distance is greater when the difference(s) in the coordinates and/or the angle of the image capturing apparatus are/is greater. In this case, the image data included in labeled data represents an image captured at a certain position, and the image data included in unlabeled data represents each of the images captured at different positions.

As an example, the inter-attribute distance calculating section 121 may calculate the sum of squares of the value of difference in the coordinates and the value of difference in the angle, or may calculate the weighted sum of squares of the value of difference in the coordinates and the value of difference in the angle. The sum or the weighted sum is the inter-attribute distance.

(Specific Examples 1 to 5 of Determination of Training Data)

Described next is specific examples 1 to 3 of a method for extracting unlabeled data, the method being carried out by the training data determining section 122.

(Specific Example 1 of Determination of Training Data)

Specific example 1 is a method of dividing the total learning time period into equal N parts and increasing training data by 1/N of the total number of the pieces of unlabeled data selected in ascending order of the inter-attribute distance from labeled data. In other words, the training data control section 12A increases the number of pieces of unlabeled data to be extracted, each time the learning time period of machine learning of the learning model LM reaches a predetermined threshold. In addition, in this increasing the training data, the training data control section 12A classifies multiple pieces of unlabeled data into a plurality of groups in accordance with the distance, and increases the number of the groups to be extracted, as the machine learning of the learning model LM progresses.

More specifically, for example, in a case where the total number of the pieces of unlabeled data is 100, N=5, and the total learning time period is 5, the training data determining section 122 extracts 20 pieces of unlabeled data which have inter-attribute distances from the labeled data smaller than those of the other pieces of unlabeled data, for learning time periods of 0 to 1. For learning time periods of 1 to 2, the training data determining section 122 extracts 40 (20+20) pieces of unlabeled data which have inter-attribute distances from the labeled data smaller than those of the other pieces of unlabeled data. For learning time periods of 2 to 3, the training data determining section 122 extracts 60 (40+20) pieces of unlabeled data which have inter-attribute distances from the labeled data smaller than those of the other pieces of unlabeled data. For learning time periods of 3 to 4, the training data determining section 122 extracts 80 (60+20) pieces of unlabeled data which have inter-attribute distances from the labeled data smaller than those of the other pieces of unlabeled data. For learning time periods of 4 to 5, 100 (80+20) pieces of unlabeled data are extracted.

(Specific Example 2 of Determination of Training Data)

Specific example 2 is a method of when pseudo labels are assigned to a certain number (e.g., 80 percent) of the pieces of training data, adding next training data. In other words, the training data control section 12A increases the number of pieces of unlabeled data to be extracted, each time the rate of assignment of a pseudo label to unlabeled data having been extracted exceeds a predetermined threshold.

More specifically, the training data control section 12A repeatedly carries out a process of adding next unlabeled data to the training data each time, for example, pseudo labels are assigned to 80 percent of the pieces of the unlabeled data having been extracted by the training data control section 12A. With this configuration, the unlabeled data are gradually used for the training in ascending order of the inter-attribute distance.

(Specific Example 3 of Determination of Training Data)

Specific example 3 is a method of when a loss calculated regarding the labeled data converges to some degree, adding next training data. In other words, the training data control section 12A increases the number of pieces of unlabeled data to be extracted, each time the loss calculated by the first loss calculating section 15A satisfies a predetermined condition for a convergence test. In this respect, the condition for a convergence test indicates that the loss converges to some degree, and is, as an example, a condition where the amount of a change in the loss is equal to or smaller than a predetermined threshold.

(Specific Example 4 of Determination of Training Data)

Specific example 4 is a method of when a loss calculated regarding the unlabeled data stabilizes to some degree, adding next training data. In other words, the training data control section 12A increases the number of pieces of unlabeled data to be extracted, each time the loss calculated by the second loss calculating section 16A satisfies a predetermined condition for a convergence test. In this respect, the condition for a convergence test indicates that the loss converges to some degree, and is, as an example, a condition where the amount of a change in the loss is equal to or smaller than a predetermined threshold.

(Specific Example 5 of Determination of Training Data)

Specific example 5 is a method of when the rate of assignment of a pseudo label stabilizes to some degree, adding next training data. In other words, the training data control section 12A increases the number of pieces of unlabeled data to be extracted, each time the rate of assignment of a pseudo label to unlabeled data having been extracted satisfies a predetermined condition for a convergence test. In this respect, the condition for a convergence test indicates that the rate of assignment converges to some degree, and is, as an example, a condition where the amount of a change (increase or decrease) in the rate of assignment is equal to or smaller than a predetermined threshold.

(Specific Example 6 of Determination of Training Data)

Specific example 6 is a method of when the sum (or weighted sum) of a loss regarding labeled data and a loss regrading unlabeled data converges to some degree, adding next training data. In other words, the training data control section 12A increases the number of pieces of unlabeled data to be extracted, each time the sum or weighted sum of the loss calculated by the first loss calculating section 15A and the loss calculated by the second loss calculating section 16A satisfies a predetermined condition for a convergence test. In this respect, the condition for a convergence test indicates that the above sum or weighted sum converges to some degree, and is, as an example, a condition where the amount of a change (e.g., increase or decrease) in the sum or weighted sum is equal to or smaller than a predetermined threshold.

However, the method of the training data control section 12A determining training data is not limited to the above examples, but the training data control section 12A may determine the training data by another method. Alternatively, the training data control section 12A may determine the training data by a combination of the methods of some or all of the specific examples 1 to 5 above. For example, the training data control section 12A may add training data in at least one case selected from the group consisting of (i) the case where the rate of assignment of a pseudo label exceeds a predetermined threshold, (ii) the case where the loss calculated regrading labeled data satisfies the predetermined condition for a convergence test, and (iii) the case where the losses calculated regarding unlabeled data satisfy the predetermined condition for a convergence test.

(Example Advantages of Information Processing Apparatus)

A configuration employed in the training data control section 12A of the information processing apparatus 1A in accordance with the present example embodiment is such that unlabeled data is extracted such that a maximum value of the distance of the unlabeled data extracted increases as the training of the learning model LM progresses. Therefore, with the information processing apparatus 1A in accordance with the present example embodiment, it is possible to make preferential use of unlabeled data the attribute of which has a higher degree of similarity with the attribute of labeled data, to conduct training, and increase the amount of unlabeled data to be used for the training as the training progresses. This provides an example advantage of being capable of generating a higher-inference accuracy learning model.

A configuration employed in the information processing apparatus 1A in accordance with the present example embodiment is such that an inferring section 14A is included which assigns a pseudo label to unlabeled data extracted by the training data control section 12A, in accordance with an inference result obtained by inputting the unlabeled data to the learning model LM, and a parameter updating section 13A uses labeled data and the unlabeled data to which the pseudo label has been assigned, to update a model parameter of the learning model LM. Therefore, the information processing apparatus 1A in accordance with the present example embodiment provides an example advantage of being capable of accurately generating a pseudo label and capable of generating a higher-inference accuracy learning model by using the pseudo label generated.

According to the information processing apparatus 1A in accordance with the present example embodiment, the attribute information includes information indicating at least one selected from the group consisting of the posture and the position of an object contained in an image, the time of image capture, an image capture time period, the type and the position of an image capturing apparatus, and an image quality, and the distance is a value calculated in accordance with at least one selected from the group consisting of a difference in the posture and the position of the object contained in the image, a difference in the time of image capture, the degree of nearness in the image capture time period, the degree of similarity in the type of the image capturing apparatus, a difference in the position of the image capturing apparatus, and a difference in the image quality.

For example, neighboring ones of the commercial products placed on the same shelf can be assumed to be similar to each other. In view of this, by making preferential use of unlabeled data that is similar to labeled data (e.g., unlabeled data similar in the posture of an article to labeled data, unlabeled data close in the time of image capture to the labeled data, and unlabeled data including a captured image of a commercial product which is placed on the same shelf that the commercial product of the labeled data is placed on), rather than any other unlabeled data, it is possible to increase the inference accuracy of the learning model LM.

The information processing apparatus 1A in accordance with the present example embodiment includes an inferring section 14A that assigns a pseudo label to unlabeled data which has been extracted by the training data control section 12A and which provides, when inputted to the learning model LM, an inference result that satisfies a predetermined condition, and the training data control section 12A increases the number of pieces of unlabeled data to be extracted, each time the rate of assignment of the pseudo label to the unlabeled data having been extracted satisfies a predetermined condition for a convergence test. The rate of assignment of a pseudo label stabilizes to a greater degree when the training of the learning model LM progresses further. Thus, with the information processing apparatus 1A in accordance with the present example embodiment, it is possible to increase the amount of unlabeled data to be used for training the learning model LM as the training progresses. This provides an example advantage of being capable of generating the learning model LM having high inference accuracy.

The information processing apparatus 1A in accordance with the present example embodiment includes an inferring section 14A that assigns a pseudo label to unlabeled data which has been extracted by the training data control section 12A and which provides, when inputted to the learning model LM, an inference result that satisfies a predetermined condition, and the training data control section 12A increases the number of pieces of unlabeled data to be extracted, each time the rate of assignment of the pseudo label to the unlabeled data having been extracted exceeds a predetermined threshold.

The rate of assignment of a pseudo label increases to a greater degree when the training of the learning model LM progresses further. Thus, with the information processing apparatus 1A in accordance with the present example embodiment, it is possible to increase the amount of unlabeled data to be used for training the learning model LM as the training progresses. This provides an example advantage of being capable of generating the learning model LM having high inference accuracy.

The training data control section 12A of the information processing apparatus 1A in accordance with the present example embodiment increases the number of pieces of unlabeled data to be extracted, each time the learning time period of the learning model LM reaches a predetermined threshold. Thus, with the information processing apparatus 1A in accordance with the present example embodiment, it is possible to increase the amount of unlabeled data to be used for training the learning model LM as the training progresses. This provides an example advantage of being capable of generating the learning model LM having high inference accuracy.

The training data control section 12A of the information processing apparatus 1A of the present example embodiment increases the number of pieces of unlabeled data to be extracted, each time the sum or weighted sum of the loss calculated by the first loss calculating section 15A and the loss calculated by the second loss calculating section 16A satisfies a predetermined condition for a convergence test. The above sum or weighted sum stabilizes to a greater degree when the training of the learning model LM progresses further. Thus, with the information processing apparatus 1A in accordance with the present example embodiment, it is possible to increase the amount of unlabeled data to be used for training the learning model LM as the training progresses. This provides an example advantage of being capable of generating the learning model LM having high inference accuracy.

The information processing apparatus 1A in accordance with the present example embodiment includes a first loss calculating section 15A which uses an inference result obtained with use of labeled data and the learning model LM and a ground-truth label of the labeled data, to calculate a loss, and the training data control section 12A increases the number of pieces of unlabeled data to be extracted, each time the loss calculated by the first loss calculating section 15A satisfies a predetermined condition for a convergence test.

The loss converges to a greater degree when the training of the learning model LM progresses further. Thus, with the information processing apparatus 1A in accordance with the present example embodiment, it is possible to increase the amount of unlabeled data to be used for training the learning model LM as the training progresses. This provides an example advantage of being capable of generating the learning model LM having high inference accuracy.

The information processing apparatus 1A in accordance with the present example embodiment includes: an inferring section 14A which assigns a pseudo label to unlabeled data extracted by the training data control section 12A, in accordance with an inference result obtained by inputting the unlabeled data to the learning model LM; and a second loss calculating section 16A which uses the inference result obtained with use of the unlabeled data and the learning model LM and the pseudo label of the unlabeled data, to calculate a loss, and the training data control section 12A increases the number of pieces of unlabeled data to be extracted, each time the loss calculated by the second loss calculating section 16A satisfies a predetermined condition for a convergence test.

The loss converges to a greater degree when the training of the learning model LM progresses further. Thus, with the information processing apparatus 1A in accordance with the present example embodiment, it is possible to increase the amount of unlabeled data to be used for training the learning model LM as the training progresses. This provides an example advantage of being capable of generating the learning model LM having high inference accuracy.

The training data control section 12A of the information processing apparatus 1A in accordance with the present example embodiment classifies multiple pieces of unlabeled data into a plurality of groups in accordance with a distance, and increases the number of the groups to be extracted, as machine learning progresses. Thus, with the information processing apparatus 1A in accordance with the present example embodiment, it is possible to increase the amount of unlabeled data to be used for training the learning model LM as the training progresses. This provides an example advantage of being capable of generating the learning model LM having high inference accuracy.

[Software Implementation Example]

Some or all of the functions of the information processing apparatuses 1 and 1A may be implemented by hardware such as an integrated circuit (IC chip), or may be implemented by software.

Figure 10:
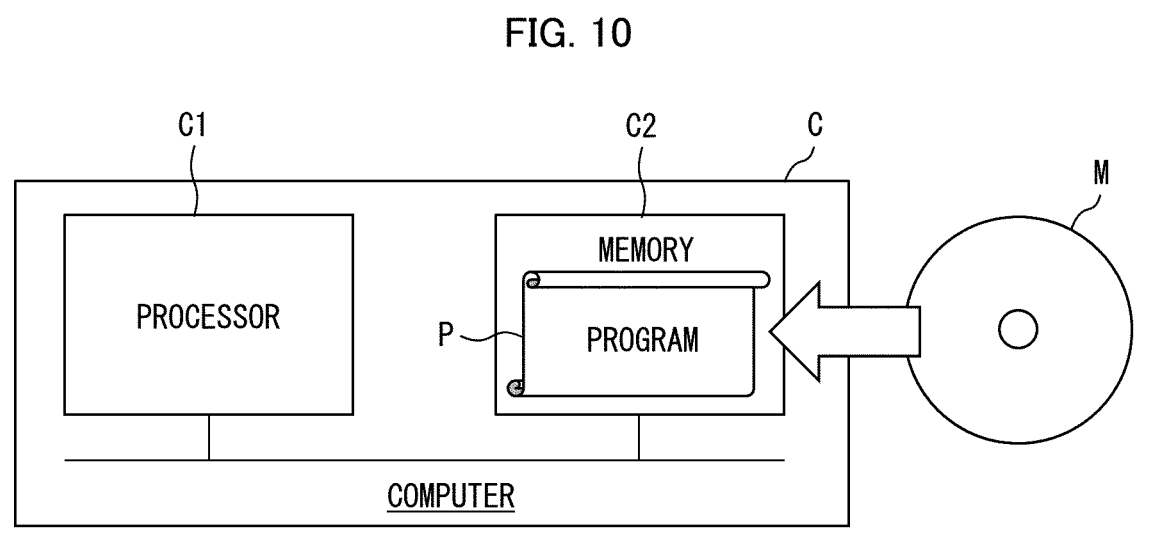

In the latter case, the information processing apparatuses 1 and 1A are provided by, for example, a computer that executes instructions of a program that is software implementing the foregoing functions. An example (hereinafter, computer C) of such at least one computer is illustrated in FIG. 10. The computer C includes at least one processor C1 and at least one memory C2. The memory C2 has stored therein a program P for causing the computer C to operate as the information processing apparatuses 1 and 1A. The at least one processor C1 of the computer C retrieves the program P from the memory C2 and executes the program P, so that the functions of the information processing apparatuses 1 and 1A are implemented.

Examples of the processor C1 can include a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, and a combination thereof. Examples of the memory C2 can include a flash memory, a hard disk drive (HDD), a solid state drive (SSD), and a combination thereof.

The computer C may further include a random access memory (RAM) into which the program P is loaded at the time of execution and in which various kinds of data are temporarily stored. The computer C may further include a communication interface via which data is transmitted to and received from another apparatus. The computer C may further include an input-output interface via which input-output equipment such as a keyboard, a mouse, a display or a printer is connected.

The program P can be recorded on a non-transitory, tangible recording medium M capable of being read by the computer C. Examples of such a recording medium M can include a tape, a disk, a card, a semiconductor memory, and a programmable logic circuit. The computer C can obtain the program P via such a recording medium M. Alternatively, the program P can be transmitted through a transmission medium. Examples of such a transmission medium can include a communication network and a broadcast wave. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

The whole or part of the example embodiments disclosed above can be described as, but not limited to, the following supplementary notes.

(Supplementary Note 1)

An information processing apparatus including an acquiring means for acquiring labeled data and unlabeled data, the labeled data being image data to which a ground-truth label and attribute information indicating an attribute of an image are attached, the unlabeled data being image data to which an attribute information indicating an attribute of an image is attached; an inter-attribute distance calculating means for calculating a distance between the labeled data and the unlabeled data, the distance being determined by the attribute information of the labeled data and the attribute information of the unlabeled data; an extracting means for extracting, from multiple pieces of unlabeled data each being the unlabeled data, unlabeled data smaller in the distance from the labeled data than another unlabeled data; and an updating means for updating a model parameter of a learning model with use of the labeled data and the unlabeled data extracted by the extracting means.

(Supplementary Note 2)

The information processing apparatus described in supplementary note 1, in which the extracting means extracts the unlabeled data such that a maximum value of the distance of the unlabeled data extracted increases as training of the learning model progresses.

(Supplementary Note 3)

The information processing apparatus described in supplementary note 1 or 2, further including a pseudo label assigning means for assigning a pseudo label to the unlabeled data extracted by the extracting means, in accordance with an inference result obtained by inputting the unlabeled data to the learning model, and the updating means is configured to update the model parameter of the learning model with use of the unlabeled data to which the pseudo label has been assigned and the labeled data.

(Supplementary Note 4)

The information processing apparatus described in any one of supplementary notes 1 to 3, in which the attribute information includes information indicating at least one selected from the group consisting of a posture and a position of an object contained in the image, a time of image capture, an image capture time period, a type and a position of an image capturing apparatus, and an image quality, and the distance is a value calculated in accordance with at least one selected from the group consisting of a difference in the posture and the position of the object contained in the image, a difference in the time of image capture, a degree of nearness in the image capture time period, a degree of similarity in the type of the image capturing apparatus, a difference in the position of the image capturing apparatus, and a difference in the image quality.

(Supplementary Note 5)

The information processing apparatus described in supplementary note 2, further including a pseudo label assigning means for assigning a pseudo label to the unlabeled data which is extracted by the extracting means and which provides, when inputted to the learning model, an inference result that satisfies a predetermined condition, and the extracting means is configured to increase the number of pieces of unlabeled data to be extracted, each time a rate of assignment of the pseudo label to the unlabeled data extracted satisfies a predetermined condition for a convergence test.

(Supplementary Note 6)

The information processing apparatus described in supplementary note 2, further including a pseudo label assigning means for assigning a pseudo label to the unlabeled data which is extracted by the extracting means and which provides, when inputted to the learning model, an inference result that satisfies a predetermined condition, and the extracting means is configured to increase the number of pieces of unlabeled data to be extracted, each time a rate of assignment of the pseudo label to the unlabeled data extracted exceeds a predetermined threshold.

(Supplementary Note 7)

The information processing apparatus described in supplementary note 2, in which the extracting means is configured to increase the number of pieces of unlabeled data to be extracted, each time a learning time period of the learning model reaches a predetermined threshold.

(Supplementary Note 8)

The information processing apparatus described in supplementary note 2, further including: a pseudo label assigning means for assigning a pseudo label to the unlabeled data extracted by the extracting means, in accordance with an inference result obtained by inputting the unlabeled data to the learning model; a first loss calculating means for calculating a loss with use of (i) an inference result obtained with use of the labeled data and the learning model and (ii) a ground-truth label of the labeled data; and a second loss calculating means for calculating a loss with use of (i) an inference result obtained with use of the unlabeled data and the learning model and (ii) a pseudo label of the unlabeled data, the extracting means being configured to increase the number of pieces of unlabeled data to be extracted, each time a sum or a weighted sum of the loss calculated by the first loss calculating means and the loss calculated by the second loss calculating means satisfies a predetermined condition for a convergence test.

(Supplementary Note 9)

An information processing method including: at least one processor acquiring labeled data and unlabeled data, the labeled data being image data to which a ground-truth label and attribute information indicating an attribute of an image are attached, the unlabeled data being image data to which an attribute information indicating an attribute of an image is attached; the at least one processor calculating a distance between the labeled data and the unlabeled data, the distance being determined by the attribute information of the labeled data and the attribute information of the unlabeled data; the at least one processor extracting, from multiple pieces of unlabeled data each being the unlabeled data, unlabeled data smaller in the distance from the labeled data than another unlabeled data; and the at least one processor updating a model parameter of a learning model with use of the labeled data and the unlabeled data extracted.

(Supplementary Note 10)

A program for causing a computer to carry out: a process of acquiring labeled data and unlabeled data, the labeled data being image data to which a ground-truth label and attribute information indicating an attribute of an image are attached, the unlabeled data being image data to which an attribute information indicating an attribute of an image is attached; a process of calculating a distance between the labeled data and the unlabeled data, the distance being determined by the attribute information of the labeled data and the attribute information of the unlabeled data; a process of extracting, from multiple pieces of unlabeled data each being the unlabeled data, unlabeled data smaller in the distance from the labeled data than another unlabeled data; and a process of updating a model parameter of a learning model with use of the labeled data and the unlabeled data extracted.

(Supplementary Note 11)

The information processing apparatus described in supplementary note 2, further including a loss calculating means for calculating a loss with use of (i) an inference result obtained with use of the labeled data and the learning model and (ii) a ground-truth label of the labeled data to calculate a loss, the extracting means being configured to increase the number of pieces of unlabeled data to be extracted, each time the loss calculated by the loss calculating means satisfies a predetermined condition for a convergence test.

(Supplementary Note 12)

The information processing apparatus described in supplementary note 2, further including a pseudo label assigning means for assigning a pseudo label to the unlabeled data extracted by the extracting means, in accordance with an inference result obtained by inputting the unlabeled data to the learning model; and a loss calculating means for calculating a loss with use of (i) an inference result obtained with use of the unlabeled data and the learning model and (ii) a pseudo label of the unlabeled data, the extracting means being configured to increase the number of pieces of unlabeled data to be extracted, each time the loss calculated by the loss calculating means satisfies a predetermined condition for a convergence test.

(Supplementary Note 13)

The information processing apparatus described in any one of supplementary notes 2, 5 to 8, 11, and 12, in which the extracting means is configured to classify multiple pieces of unlabeled data each being the unlabeled data into a plurality of groups in accordance with the distance, and increase the number of the plurality of groups to be extracted, as learning of the learning model progresses.

(Supplementary Note 14)

An information processing apparatus including at least one processor, the at least one processor carrying out: an acquiring process of acquiring labeled data and unlabeled data, the labeled data being image data to which a ground-truth label and attribute information indicating an attribute of an image are attached, the unlabeled data being image data to which an attribute information indicating an attribute of an image is attached; an inter-attribute distance calculating process of calculating a distance between the labeled data and the unlabeled data, the distance being determined by the attribute information of the labeled data and the attribute information of the unlabeled data; an extracting process of extracting, from multiple pieces of unlabeled data each being the unlabeled data, unlabeled data smaller in the distance from the labeled data than another unlabeled data; and an updating process of updating a model parameter of a learning model with use of the labeled data and the unlabeled data extracted in the extracting process.

This information processing apparatus may further include a memory, and this memory may have stored therein a program for causing the at least one processor to carry out the acquiring process, the inter-attribute distance calculating process, the extracting process, and the updating process. In addition, this program may be recorded on a computer-readable, non-transitory, and tangible recording medium.

REFERENCE SIGNS LIST

1, 1A: Information processing apparatus
11: Acquiring section
12, 121: Inter-attribute distance calculating section
13: Extracting section
14: Updating section
12A: Training data control section
122: Training data determining section
13A: Parameter updating section
14A: Inferring section
15A: First loss calculating section
16A: Second loss calculating section

The invention claimed is:

1. An information processing apparatus, comprising:

at least one memory storing instructions; and at least one processor configured to execute the instructions to:

acquire labeled data and unlabeled data, the labeled data being image data to which a ground-truth label and attribute information indicating an attribute of an image are attached, the unlabeled data being image data to which attribute information indicating an attribute of an image is attached;

calculate a distance between the labeled data and the unlabeled data based on the attribute information of the labeled data and the attribute information of the unlabeled data;

extract, from multiple pieces of unlabeled data, unlabeled data with a smaller distance from the labeled data than from another unlabeled data; and update a model parameter of a learning model based on the labeled data and the unlabeled data that is extracted, wherein the at least one processor is further configured to execute the instructions to extract the unlabeled data such that a maximum value of the distance of the unlabeled data that is extracted increases as training of the learning model progresses, the training of the learning model includes the updating of the model parameter, the at least one processor is further configured to execute the instructions to train the learning model in separate steps, and the at least one processor is further configured to execute the instructions to, in a first step, extract one or more first pieces of the unlabeled data in which a first inter-attribute distance from the labeled data is closer than other pieces of the unlabeled data, and to, in a second step, further extract one or more second pieces of the unlabeled data in which a second inter-attribute distance from the labeled data is greater than the first inter-attribute distance.

2. The information processing apparatus according to claim 1, wherein the at least one processor is further configured to execute the instructions to assign a pseudo label to the unlabeled data extracted, in accordance with an inference result obtained by inputting the unlabeled data to the learning model, and the at least one processor is further configured to execute the instructions to update the model parameter of the learning model based on the unlabeled data to which the pseudo label has been assigned and the labeled data.

3. The information processing apparatus according to claim 1, wherein the attribute information includes information indicating at least one selected from a first group including a posture and a position of an object contained in the image, a time of image capture, an image capture time period, a type and a position of an image capturing apparatus, and an image quality, and the distance is a value calculated in accordance with at least one selected from a second group including a difference in the posture and the position of the object contained in the image, a difference in the time of image capture, a degree of nearness in the image capture time period, a degree of similarity in the type of the image capturing apparatus, a difference in the position of the image capturing apparatus, and a difference in the image quality.

4. The information processing apparatus according to claim 1, wherein the at least one processor is further configured to execute the instructions to assign a pseudo label to the unlabeled data which is extracted and which provides, when inputted to the learning model, an inference result that satisfies a predetermined condition, and the at least one processor is further configured to execute the instructions to increase the number of pieces of unlabeled data to be extracted, each time a rate of assignment of the pseudo label to the unlabeled data extracted satisfies a predetermined condition for a convergence test.

5. The information processing apparatus according to claim 1, wherein the at least one processor is further configured to execute the instructions to assign a pseudo label to the unlabeled data which is extracted and which provides, when inputted to the learning model, an inference result that satisfies a predetermined condition, and the at least one processor is further configured to execute the instructions to increase the number of pieces of unlabeled data to be extracted, each time a rate of assignment of the pseudo label to the unlabeled data extracted exceeds a predetermined threshold.

6. The information processing apparatus according to claim 1, wherein the at least one processor is further configured to execute the instructions to increase the number of pieces of unlabeled data to be extracted, each time a learning time period of the learning model reaches a predetermined threshold.

7. The information processing apparatus according to claim 1, wherein the at least one processor is further configured to execute the instructions to:

assign a pseudo label to the unlabeled data extracted, in accordance with an inference result obtained by inputting the unlabeled data to the learning model;

calculate a first loss with use of (i) a first inference result obtained with use of the labeled data and the learning model and (ii) a ground-truth label of the labeled data; and calculate a second loss with use of (i) a second inference result obtained with use of the unlabeled data and the learning model and (ii) the pseudo label of the unlabeled data, increase the number of pieces of unlabeled data to be extracted, each time a sum or a weighted sum of the first loss and the second loss satisfies a predetermined condition for a convergence test.

8. An information processing method performed by at least one processor, the information processing method comprising:

acquiring labeled data and unlabeled data, the labeled data being image data to which a ground-truth label and attribute information indicating an attribute of an image are attached, the unlabeled data being image data to which attribute information indicating an attribute of an image is attached;

calculating a distance between the labeled data and the unlabeled data based on the attribute information of the labeled data and the attribute information of the unlabeled data;

extracting, from multiple pieces of unlabeled data each being the unlabeled data, unlabeled data smaller in the distance from the labeled data than another unlabeled data; and updating a model parameter of a learning model based on the labeled data and the unlabeled data extracted, wherein the extracting of the unlabeled data comprises extracting the unlabeled data such that a maximum value of the distance of the unlabeled data extracted increases as training of the learning model progresses, the information processing method further comprises training the learning model in separate steps, the training of the learning model includes the updating of the model parameter, and the extracting of the unlabeled data comprises, in a first step, extracting one or more first pieces of the unlabeled data in which a first inter-attribute distance from the labeled data is closer than other pieces of the unlabeled data, and to, in a second step, further extracting one or more second pieces of the unlabeled data in which a second inter-attribute distance from the labeled data is greater than the first inter-attribute distance.

9. A computer-readable, non-transitory recording medium having recorded thereon a program for causing a computer to acquire labeled data and unlabeled data, the labeled data being image data to which a ground-truth label and attribute information indicating an attribute of an image are attached, the unlabeled data being image data to which attribute information indicating an attribute of an image is attached;

calculate a distance between the labeled data and the unlabeled data based on the attribute information of the labeled data and the attribute information of the unlabeled data;

extract, from multiple pieces of unlabeled data each being the unlabeled data, unlabeled data smaller in the distance from the labeled data than another unlabeled data; and update a model parameter of a learning model based on the labeled data and the unlabeled data extracted, wherein the program further causes the computer to extract the unlabeled data such that a maximum value of the distance of the unlabeled data extracted increases as training of the learning model progresses, the program further causes the computer to train the learning model in separate steps, and the program further causes the computer to, in a first step, extract one or more first pieces of the unlabeled data in which a first inter-attribute distance from the labeled data is closer than other pieces of the unlabeled data, and to, in a second step, further extract one or more second pieces of the unlabeled data in which a second inter-attribute distance from the labeled data is greater than the first inter-attribute distance.

* * * * *